Patented Oct. 13, 1925.

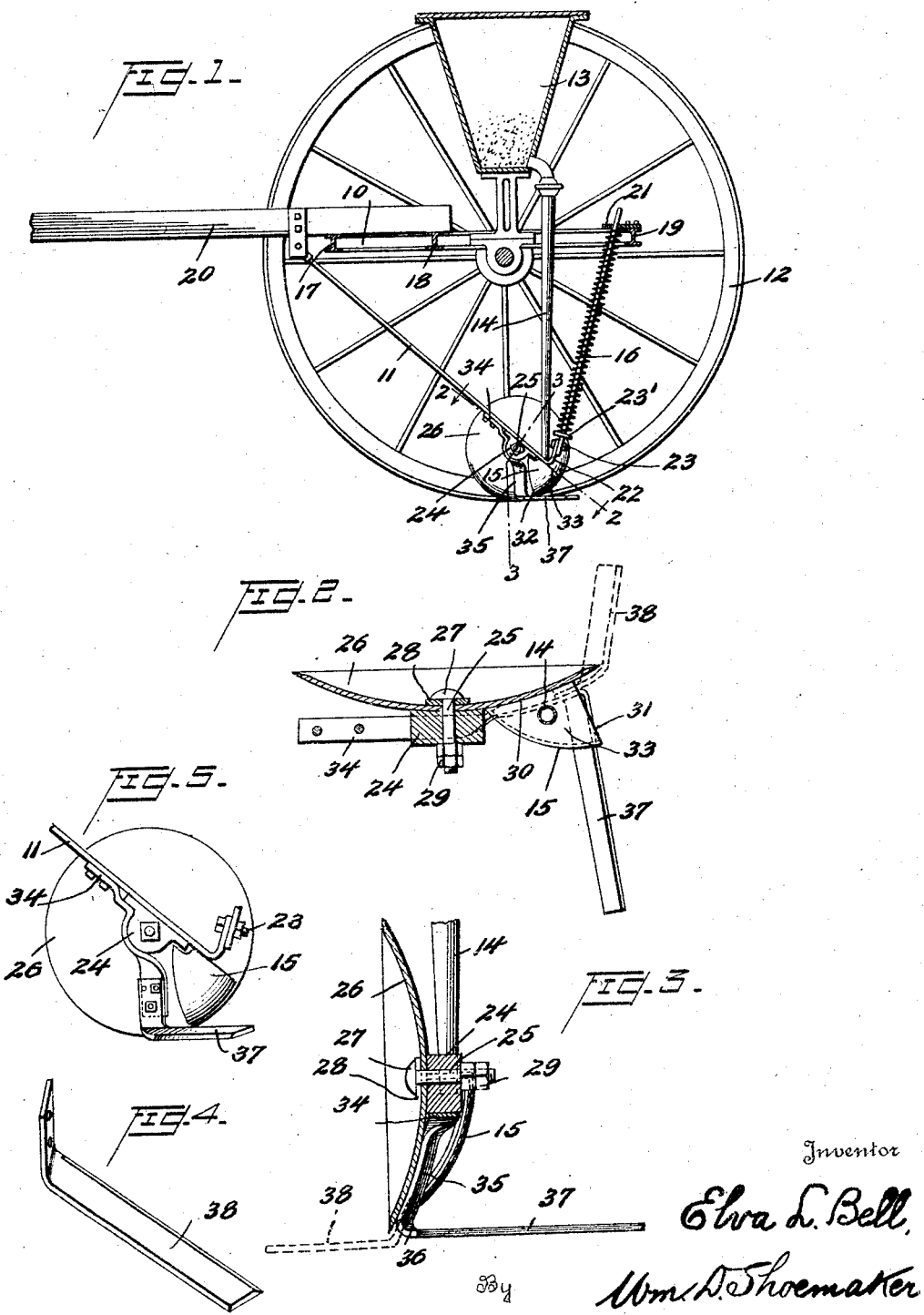

1,556,899

UNITED STATES PATENT OFFICE.

ELVA L. BELL, OF WENATCHEE, WASHINGTON.

COMBINED GRAIN-DRILL TOOTH AND HOE.

Application filed December 29, 1922. Serial No. 609,742.

*To all whom it may concern:*

Be it known that I, ELVA L. BELL, a citizen of the United States, formerly residing at Choteau, in the county of Teton and State of Montana, now a resident of Wenatchee, Chelan County, Washington, have invented certain new and useful Improvements in Combined Grain-Drill Teeth and Hoes, of which the following is a specification.

This invention has relation to a combined drill tooth and hoe and more particularly to a device capable of attachment to a drag bar of a grain drill which will cut the weeds below the surface of the ground, open a furrow, drop a seed therein and cover the seed by the dirt which is permitted to roll back into the furrow. The special adaptation of my invention selected for the purpose of illustrating the same is its use in a grain drill in which a series of draw bars are pivotally attached to a frame work and capable of being lifted from the ground for the transportation thereof, said drawbars having a capability of independent movement and held spring pressed toward the ground. The machine is provided with means for feeding grain in small quantities as it progresses across prepared ground.

The invention has for its object the production, in a grain drill of the type just described, of a combined furrow opener, hoe and grain shield whereby the ground can be at one and the same time freed from weeds by the hoe and seed sowed therein by the furrow opener and grain shield. Another object of the invention is the improvement of the details of construction of such a combined hoe and drill tooth whereby either a single hoe or a double hoe may be used and the parts readily attached to a grain drill of standard construction of framework. Other objects and advantages of the invention will hereinafter appear in the following description, and the novel features thereof will be particularly pointed out in the appended claims.

In the drawings in which like reference characters indicate like parts throughout the several figures of the drawing, Figure 1 is a section through a multiple unit grain drill, showing one of the dragbars and the combined drill tooth and hoe of my invention in elevation;

Figure 2 is a sectional view of the invention taken upon the line 2—2 of Figure 1;

Figure 3 is a sectional view taken upon the line 3—3 of Figure 1;

Figure 4 is a detached view of the supplemental hoe, which may or may not be used, as desired, and Figure 5 is a modified form of my invention, showing an adjustable hoe element.

It will be appreciated that while I have shown the combined drill tooth and hoe of my invention in a multiple unit grain drill, that it may be used in a single unit grain drill, as for instance in the ordinary garden hand drill. It will be obvious that changes in the details of construction may be made without departing from the spirit of the invention. It is therefore to be understood that the particular embodiment shown, and described in this application is indicative only of the invention.

For the purpose of illustration, I have shown the invention applied to a grain drill of the multiple unit type which comprises a framework 10 supporting drawbars 11 and mounted upon wheels 12. The frame carries a hopper 13 in which may be mounted any suitable form of dispensing apparatus for the grain within the hopper designed to deliver the same to the boots 14 from which it passes to the shield 15 of my combined drill tooth and hoe. The character 16 represents a rod about which is placed a spring for the purpose of holding the dragbar to the ground in the usual manner. The cross angle members 17, 18 and 19 of the drill frame support a tongue 20 and a bar 21, through which the rods 16 pass. It will be understood that the structure hereinbefore set forth typifies the usual grain drill construction which may be varied.

The lower end of the dragbar 11 is provided with a bent up portion 22 to which the end of the rod 16 is attached in any suitable manner, as by the bolt 23, a collar 21 being provided on said rod for the abutment of the spring. Upon the lower end of the dragbar there is mounted in any suitable manner a bearing 24 for a shaft 25 carrying the furrow opener 26 which is in the form of a single disc held to the face of the bearing block 24 by means of the headed end 27 of the shaft and the washer 28. The shaft is locked in suitable position by the locknut 29. This mounting of the shaft upon the drawbar is conventional and may be altered as occasion may provide.

Upon the dragbar and below the bearing block 24 is mounted a shield in any suitable manner but I prefer that it be clamped by bolts to the end of the dragbar with an upper apertured face and a curved depending flange whose front edge 32 conforms to the contour of the disc 26 so as to provide a scraping edge for the purpose of clearing said disc of dirt which may attach itself thereto in the travel of the machine. The rear edge 31 of the shield is spaced from the periphery of the disc and meets the front edge at a point below the ground, indicated by the numeral 32. The intermediate curved portion of the shield forms with the face of the revolving disc a pocket into which the seed drops and is conveyed at the point 32 to its position in the furrow formed by the disc 26 prior to the falling back of some of the dirt into the furrow. The upper face 33 of the shield, as well as the drawbar are provided with suitable openings into which the flexible boot 14 extends.

In advance of the bearing block 24, the hoe of my invention is attached to the drawbar as indicated by the numeral 34. This hoe takes the form of a strap of metal which follows the contour of the bearing and is so bent that its forward edge 35 conforms closely to the contour of the disc 26 so as to provide an additional scraping element for the purpose of cleaning the disc in its rotation in advance of the cleaning by the forward edge of the shield. At substantially the periphery of the disc, this strap is bent as at 36 into a horizontal plane and lies at a slight angle to the rear of a line transverse the line of travel of the grain drill. The continuation of the forward scraping edge of this strap forms the hoe which travels beneath the ground and cuts the young weeds below the surface of the ground.

This strap, it will be understood, is made of sufficiently heavy material to withstand considerable strain and in this location will be the portion of the grain drill tooth combination to be struck by impediments and to lift the dragbar from the ground when necessary. The bent portion of the strap lying directly under the bearing will be the part which will withstand the vertical strain due to the coming in contact with temporary obstructions such as stones.

Where my invention is used as the element of a single row drill, as in the small garden planter, or where it is used at the end of a series of units, as in a multiple row grain drill, it is desirable to have a companion hoe member in order that the weeds to both sides of the furrow may be cut. In a multiple row drill, it will be appreciated that the hoe 37 will cover the ground intervening between two discs 26 and will further act to a limited extent as a coverer of the seed deposited in the adjacent furrow.

In Figure 4, I have shown my companion hoe member 38 and in Figure 3 I have shown it attached to the hoe 37 above the bend 36. In Figure 2, the two hoe members are shown in their relative positions in the ground. In these views, this suplemental hoe is shown in dotted lines.

In Figure 5, I have shown my hoe attachment made of two pieces connected by bolts. There are three bolt holes in the lower end of the upper or strap support and three bolt holes in the short leg of the hoe member. It will be appreciated that by using the lower bolt as a pivot the hoe element of Figure 5 may be shifted to convert the hoe into a shallow or a deep cutting tool.

From the foregoing description, the operation of my combined drain drill and hoe should be apparent. It will be appreciated that grain dropped thru the boot 14 from the hopper 13 into the pocket formed by the shield 15 will be deposited in the ground at the time that the disc 26 has opened the furrow and prior to the time when the hoe 37 of an adjacent unit works that portion of the ground in advance of this seed dropping and when the supplemental hoe is used it will operate in advance of the seed dropping in that particular furrow, but will so agitate the ground in connection with adjacent furrows that dirt may be deposited therein in addition to that which is permitted to roll back into the furrow in the opening operation by the disc 26. The forward edge 35 of the hoe acts as a scraper for the disc in advance of the forward edge 32 of the shield, whereby a particularly efficient scraping of the disc is performed. It will also be appreciated that the strap is made strong enough to withstand the shock of obstructions, such as stones, and that it will cause the disc to be raised out of the ground thru its close association with the bearing 24.

While I have shown my hoe attachment as secured to the drag bar by a peculiar shaped supporting strap, it will be appreciated that the form of such strap is dependent upon the particular grain drill to which my hoe is to be attached. It may take in some makes of drills the shape of a right angle or of a curved arm. My invention is also applicable for attachment to disk harrows as well as grain drills.

Having described my invention, what I claim as new and desire to secure by Letters Patent is:

1. In a grain drill, a trailing dragbar, a drill tooth unit supported at the lower end of the drag bar and comprising a furrow opener and a grain guide, and a hoe carried by said drag bar and operating at one side of said furrow opener, said hoe including a portion bent to provide a cutting edge lying in substantially the horizontal plane tangential to the periphery of the furrow opener and in advance of the open end of said grain guide.

2. In a combined drill tooth and hoe, a dragbar, a rotating furrow opener mounted in a bearing upon said dragbar, a grain guide or shield associated therewith and a hoe comprising a strap mounted upon said dragbar partially encircling the said bearing, and having its end bent to provide a cutting edge lying in substantially the horizontal plane tangential to the periphery of the furrow opener.

3. In a combined grain drill and hoe, the combination of a dragbar, a rotary furrow opener mounted thereon, a seed guide or shield associated therewith, a horizontal blade mounted upon said dragbar and having a cutting edge operating upon the ground at one side of the furrow opener in advance of the seed guide, and a supplemental blade attached to said first blade for operating upon the ground at the opposite side of said furrow opener.

In testimony whereof I affix my signature.

ELVA L. BELL.